Dec. 13, 1955        W. MANDLER        2,726,574
REFLECTING MIRROR AND LENS OBJECTIVE OF THE CASSEGRAIN TYPE
Filed Aug. 30, 1951
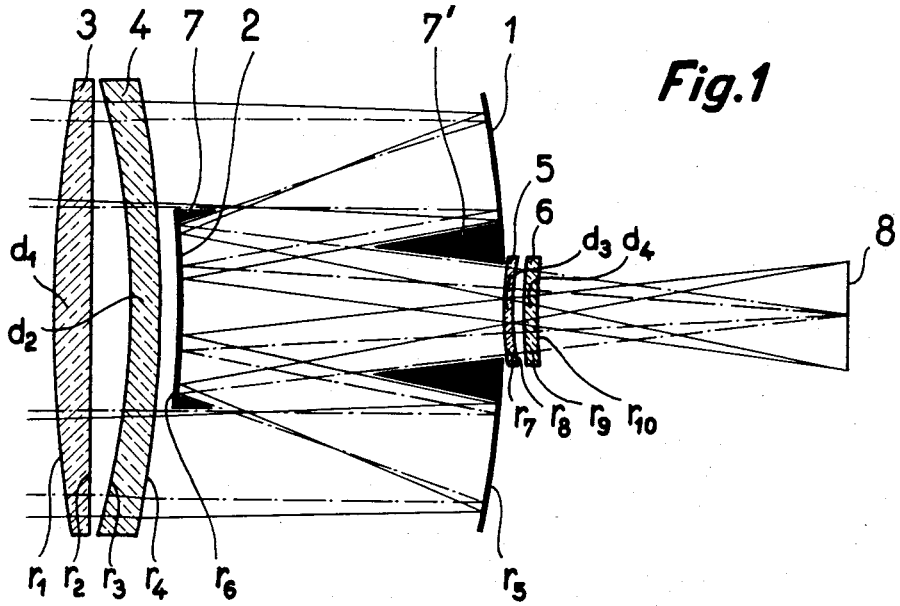
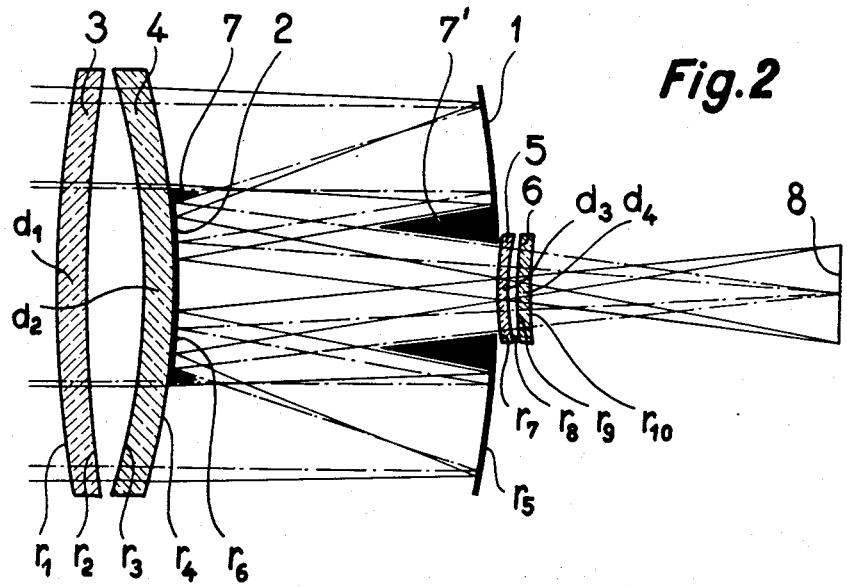
INVENTOR.
Walter Mandler

United States Patent Office 2,726,574
Patented Dec. 13, 1955

2,726,574

REFLECTING MIRROR AND LENS OBJECTIVE OF THE CASSEGRAIN TYPE

Walter Mandler, Atzbach, near Wetzlar, Germany, assignor to Ernst Leitz, G. m. b. H., a corporation of Germany Application August 30, 1951, Serial No. 244,376

Claims priority, application Germany September 11, 1950

3 Claims. (Cl. 88—57)

This invention relates to improvements in reflecting lens objectives which are characterized by having a great focal length, 600 mm. for example; an aperture opening in the proportion of 1:5; a distance of the image from the last lens vertex of at least 113 mm., and an useful angle of vision of 4 degrees. Such objectives are particularly useful for photographic purposes.

It is known, that for a correction element of the Schmidt type, which often is used for eliminating the image defects of a spherical mirror, a correction element consisting of spherical surfaces may be substituted. The Swiss Patent 255,151 describes such an objective in which a correction element is placed in front of the spherical mirror, said element comprising a meniscus and a positive lens, both of which are made of the same kind of glass and together yield a low positive refractive power. If these refractive powers are low enough, it is possible, by using only one kind of glass, to provide a mirror which is almost without chromatic defects.

The object of the invention is to utilize such known means for the construction of an objective of the Cassegrain type. The invention is embodied in such an objective in which one correction element is placed in the path of the light rays in front of the collecting main mirror, and a second correction element is placed behind the second dispersing mirror. Each of the said correction elements consists of two spherical lenses positioned close together. The refracting power of each element is zero and all the lenses are made of the same kind of glass.

In the accompanying drawing Figures 1 and 2 are diagrams illustrating objectives embodying the invention in accordance with the data contained in the table of values appearing hereinafter in the description of each of the figures in the drawing and also included in the claims, which should be read accordingly. In the tables the radii of curvature, the lens thicknesses, the axial distances between lens elements and other dimensional and optical details are specified and enumerated, namely that $r$ = the radius
$d$ = thickness of lens
$r$ to $r$ = distance between lenses
$n$ = refractive index
$f$ = focal length of the system The aperture proportion and the angle of vision are also set forth.

In the drawing the main mirror 1 is concave, the mirror 2 is convex. The first correction element comprises a meniscus 3 and a lens 4. The second correction element comprises the lenses 5 and 6. The numerals 7 and 7' indicate screening members for preventing the passage of undesirable light rays.

Fig. 1 illustrates a reflecting lens objective embodying the invention in which the several elements shown are characterized by the following values:

| | Thicknesses | Distances |
|---|---|---|
| $r_1 = +\ 659.1$ | | $r_2$ to $r_3 =\ 15.7$ |
| | $d_1 = 13.6$ | $r_4$ to $r_5 =\ 9.4$ |
| $r_2 = +1669.7$ | | $r_3$ to $r_4 = 125.5$ |
| $r_3 = +\ 296.1$ | | $r_4$ to $r_5 = 134.9$ |
| | $d_2 = 11.5$ | $r_5$ to $r_7 = 125.5$ |
| $r_4 = -\ 413.8$ | | $r_8$ to $r_9 =\ 3.1$ |
| $r_5 = -\ 444.2$ | | |
| $r_6 = -\ 307.8$ | | |
| $r_7 = +\ 104.6$ | | |
| | $d_3 =\ 4.2$ | |
| $r_8 = +\ 81.6$ | | |
| $r_9 = +\ 221.8$ | | |
| | $d_4 =\ 8.3$ | |
| $r_{10} = +\ 429.8$ | | |

$n = 1.514/64$.
Distance of the image from the last lens vertex = 123 mm.
Aperature proportion = 1:5.
Angle of vision = 4 degrees.

Fig. 2 illustrates another reflecting lens objective embodying the invention in which the several elements are characterized by the following values.

| | Thicknesses | Distances |
|---|---|---|
| $r_1 = +476.9$ | | $r_2$ to $r_3 =\ 21.0$ |
| | $d_1 = 13.6$ | $r_4$ to $r_5 =\ 0$ |
| $r_2 = +712.6$ | | $r_3$ to $r_4 = 125.8$ |
| $r_3 = -249.3$ | | $r_4$ to $r_5 = 125.8$ |
| | $d_2 = 12.6$ | $r_6$ to $r_7 = 125.8$ |
| $r_4 = -308.1$ | | $r_8$ to $r_9 =\ 3.1$ |
| $r_5 = -444.9$ | | |
| $r_6 = -308.1$ | | |
| $r_7 = +104.8$ | | |
| | $d_3 =\ 4.2$ | |
| $r_8 = +\ 81.7$ | | |
| $r_9 = +209.4$ | | |
| | $d_4 =\ 6.3$ | |
| $r_{10} = +402.1$ | | |

$n = 1.514/64$.
Distance of the image from the last lens vertex = 121.75 mm.
Aperture proportion = 1:5.
Angle of vision = 4 degrees.

I claim:

1. A reflecting lens objective of the Cassegrain type comprising a front correction element consisting of a front spherical concave lens and a rear spherical convex lens placed close together; a collecting main mirror behind said front correction element; a dispersing mirror behind said collecting main mirror spaced a relatively great distance therefrom, said collecting main mirror being provided with an axially disposed aperture; a second rear correction element consisting of two spherical lenses placed close together and positioned behind said dispersing mirror in axial alinement with the said aperture in said collecting main mirror; each of said two correction elements having a refracting power of zero and all of said lens elements being made of the same kind of glass; and screening members between the said collecting main mirror and said dispersing mirror to exclude the passage of undesirable light rays through the said objective.

2. A reflecting lens objective of the Cassegrain type in which one correction element is positioned in front of the collecting mirror and a second correction element is positioned behind the second dispersing mirror, each of said elements consisting of two spherical lenses placed close together, each of said correction elements having a refracting power of zero and all of said lenses being made of the same kind of glass characterized by the following data:

|  | Thicknesses | Distances |
|---|---|---|
| $r_1 = +\ 659.1$ |  | $r_2$ to $r_3 = 15.7$ |
| $r_2 = +1669.7$ | $d_1 = 13.6$ | $r_4$ to $r_6 = 9.4$ |
| $r_3 = -\ 296.1$ |  | $r_5$ to $r_6 = 125.5$ |
| $r_4 = -\ 413.6$ | $d_2 = 11.5$ | $r_4$ to $r_5 = 134.9$ |
| $r_5 = -\ 444.2$ |  | $r_6$ to $r_7 = 125.5$ |
| $r_6 = -\ 307.6$ |  | $r_8$ to $r_9 = 3.1$ |
| $r_7 = +\ 104.6$ |  |  |
| $r_8 = +\ 81.6$ | $d_3 = 4.2$ |  |
| $r_9 = +\ 221.8$ |  |  |
| $r_{10} = +\ 429.8$ | $d_4 = 6.3$ |  |

$r$ = radius.
$d$ = thickness of lens.
$r$ to $r$ = distance between lenses.
Refractive index $n = 1.514/64$.
Focal length $f = 600$ mm.
Distance of the image from the last lens vertex = 123 mm.
Aperture proportion = 1:5.
Angle of vision = 4 degrees.

3. A reflecting lens objective of the Cassegrain type in which one correction element is positioned in front of the collecting mirror and a second correction element is positioned behind the second dispersing mirror, each of said elements consisting of two spherical lenses placed close together, each of said correction elements having a refracting power of zero and all of said lenses being made of the same kind of glass characterized by the following data:

|  | Thicknesses | Distances |
|---|---|---|
| $r_1 = +476.9$ |  | $r_2$ to $r_3 = 21.0$ |
| $r_2 = +712.6$ | $d_1 = 13.6$ | $r_1$ to $r_6 = 0$ |
| $r_3 = -249.3$ |  | $r_5$ to $r_6 = 125.8$ |
| $r_4 = -308.1$ | $d_2 = 12.6$ | $r_4$ to $r_5 = 125.8$ |
| $r_5 = -444.9$ |  | $r_6$ to $r_7 = 125.8$ |
| $r_6 = -308.1$ |  | $r_8$ to $r_9 = 3.1$ |
| $r_7 = +104.8$ |  |  |
| $r_8 = +\ 81.7$ | $d_3 = 4.2$ |  |
| $r_9 = +209.4$ |  |  |
| $r_{10} = +402.1$ | $d_4 = 6.3$ |  |

$r$ = radius.
$d$ = thickness of lens.
$r$ to $r$ = distance between lenses.
Refractive index $n = 1.514/64$.
Focal length $f = 600$ mm.
Distance of the image from the last lens vertex = 121.75.
Aperture proportion = 1:5.
Angle of vision = 4 degrees.

References Cited in the file of this patent

UNITED STATES PATENTS

| 2,403,660 | Hayward | July 9, 1946 |
| 2,420,349 | Bouwers | May 13, 1947 |
| 2,492,461 | Bouwers | Dec. 27, 1949 |
| 2,504,383 | Bouwers et al. | Apr. 18, 1950 |
| 2,520,635 | Grey | Aug. 29, 1950 |

FOREIGN PATENTS

| 618,253 | Great Britain | Feb. 18, 1949 |
| 969,797 | France | May 31, 1950 |